Patented May 12, 1931

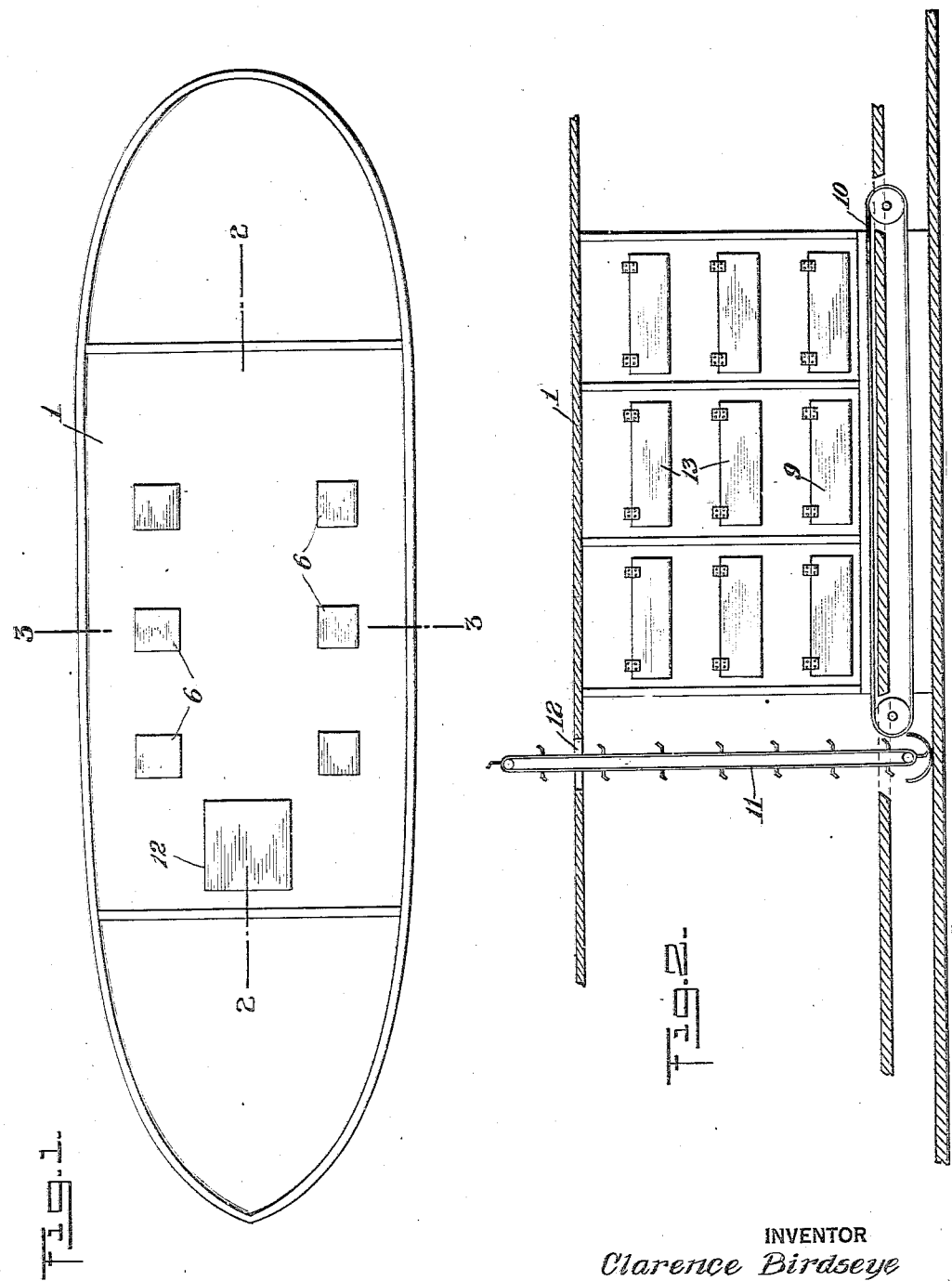

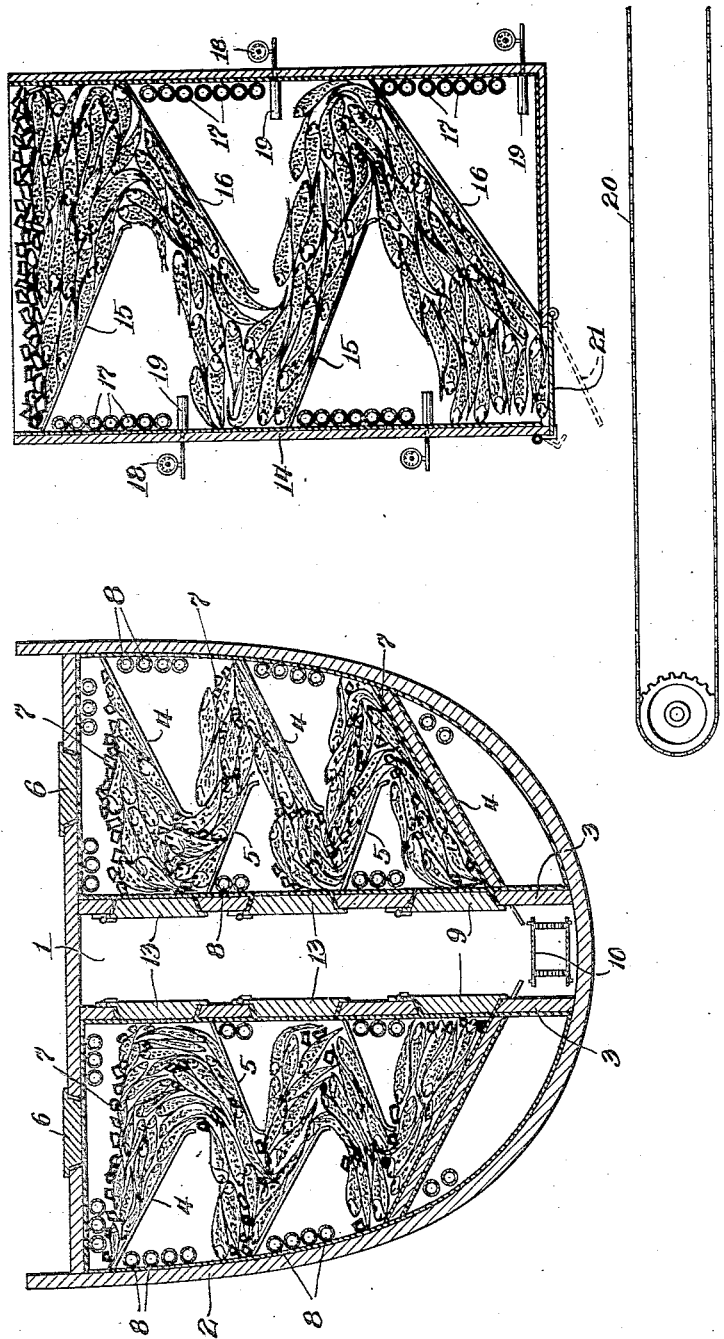

1,805,354

UNITED STATES PATENT OFFICE

CLARENCE BIRDSEYE, OF GLOUCESTER, MASSACHUSETTS, ASSIGNOR, BY MESNE ASSIGNMENTS, TO FROSTED FOODS COMPANY, INC., OF DOVER, DELAWARE, A CORPORATION OF DELAWARE

BIN FOR STORAGE OF FISH

Application filed May 3, 1928. Serial No. 274,769.

This invention relates to bins for storing fish, and is intended more particularly for the temporary storage of fish, as upon boats from the time the fish are caught until brought to dock, or in a plant while the fish await their turn to be dressed or otherwise operated upon.

The objects of the invention are to provide an improved bin for storing fish so as to prevent undue pressure thereon and undue deterioration thereof and to properly ice or otherwise refrigerate the fish while so stored so that the fish may be kept equally cold throughout the entire storage space. The invention likewise includes other objects which will be apparent to those skilled in the art as this description proceeds.

Referring to the accompanying drawings in which like numerals of reference indicate similar parts throughout the several views:

Figure 1 is a plan of the deck of a vessel;

Figure 2 is a sectional view on line 2—2 thereof showing the unloading equipment positioned as in use;

Figure 3 is a sectional view on line 3—3 of Fig. 1 showing the vessel loaded; and Figure 4 is a similar sectional view showing the application of the invention in a form such as might be used on shore in a plant or elsewhere.

Heretofore considerable difficulty has been experienced in handling and storing fish partly due to the repeated jabbing of the fish with forks in loading and unloading the vessel and including shifting the fish around during the loading after they have been thrown into the vessel. Likewise heretofore the fish have been dumped in a heap in the vessel and the under fish have been very much damaged by the pressure of the fish above and have become soggy and soft. In the present invention I preferably provide a central passage 1 through the vessel 2 by substantially parallel walls 3, 3. The fish are stored between the said parallel walls or partitions 3 and the outside walls of the vessel. The storage of the fish is preferably such that only a limited height of fish is permitted at any one point and yet the entire depth of the vessel may be utilized. In carrying out my invention, I provide a plurality of sloping shelves or supports 4 from the outer wall of the vessel toward the partition 3, said support, except for the bottom one, terminating a distance from the partition so as to permit the fish to slide over the lower end of the support between the support and partition. I also provide from the partition 3 other sloping shelves or supports 5 staggered with respect to the first mentioned supports and spaced from them so as to permit passage of the fish from the first support to the second and from the second to the third and so forth to the bottom of the vessel or lowest support. By this arrangement, the fish may be introduced into the vessel through hatches 6 in the deck and instead of dropping directly to the bottom of the vessel which is injurious to the fish, they engage the upper support 4 and slide down to the next support and so forth until they end up at the bottom of the vessel. As the vessel is filled the fish rest upon the several supports with the pressure on any one fish even at the lowest support being less than an injurious pressure notwithstanding the quantity of fish carried above by virtue of the several supports or shelves.

In order to refrigerate the fish while retained in the vessel, cracked ice 7 may be introduced with the fish if so desired to keep the fish cool from top to bottom and this ice will not be caused to melt rapidly at the bottom as heretofore because of the greater pressure, since the pressure is substantially even throughout the vessel in the present invention. Likewise, if so desired the vessel may be equipped with refrigerating apparatus, cooling pipes 8 having been shown preferably in the open spaces beneath the upper ends of the several supports or shelves and under the deck. However, the placing of these cooling pipes or the specific means of refrigerating the fish may be varied as found necessary or desirable without departing from the spirit or scope of the present invention.

In order to remove the fish from the several supports or shelves, I provide a door or trap 9 in the partition at the bottom of the lowest support 4. In the passageway below this said door 9 I also preferably provide a conveyor 10. By opening the door 9 the fish will slide down onto the conveyor and be carried along to one end of the vessel where an elevator 11 may be positioned for bringing the fish up through a hatch 12 through the deck of the vessel and there be removed as in baskets or otherwise. It will be noted that the fish when permitted to slide through the door 9 onto the conveyor will release the support for the fish above and since the fish are somewhat slippery in their natural state and even more so in view of the melting of the ice amongst them, they will continue to slide down the several shelves until the entire section of the vessel is empty. However, in case of the fish becoming clogged in any way on any of the upper shelves, I provide other doors 13, 13 for getting at the fish throughout the vessel, these several doors likewise enabling the vessel to be kept clean and sanitary at all times. As shown in Figure 2, the vessel is prefrably divided into sections longitudinally with each section prqvided with the several doors 9 and 13.

While the invention is intended primarily for use on vessels, it is deemed within the scope of the invention to also utilize the same on shore or elsewhere, and I have accordingly illustrated in Figure 4 a bin 14 having sloping shelves or supports 15, 16 in staggered relation and spaced from each other similar to the supports 4 and 5 so that the fish may be introduced at the top of the bin and will slide from support to support to the bottom of the bin with a limited pressure on the fish throughout. The fish in this bin may be iced or refrigerated as described in the previous figures, pipes 17 being shown herein for that purpose arranged in the open spaces beneath the shelves. In this connection, either of the constructions may include thermometers 18 and thermostats 19 if so desired.

Beneath the bin I have shown a conveyor 20 for receiving the fish from the lowest support 16 through a trap door or other opening 21 in the bin, thus enabling the fish to be transported from the bin to such other place as found desirable.

Obviously detail changes and modifications may be made in the steps of my process or in the details of construction, and I do not wish to be understood as limiting myself to the exact steps or structure shown and described except as set forth in the following claims when construed in the light of the prior art.

Having thus described my invention, I claim:—

1. A bin for the storage of fish comprising enclosing walls, inwardly and downwardly extending shelves alternately projecting in staggered relation from opposite walls, an opening through which fish can be delivered onto the topmost shelf and an opening adjacent the bottom of the bin through which the fish can be discharged.

2. A bin for the storage of fish comprising enclosing walls, inwardly and downwardly extending shelves alternately projecting in staggered relation from opposite walls, and refrigerating means in the area under one or more of the shelves.

3. A bin for the storage of fish comprising enclosing walls, inwardly and downwardly extending shelves alternately projecting in staggered relation from opposite walls, an opening for delivering fish onto the topmost shelf, and refrigerating means in the area under one or more of the shelves so positioned as not to obstruct the passage of fish from any shelf to the shelf next below.

CLARENCE BIRDSEYE.